United States Patent [19]

Cuvilly

[11] Patent Number: 4,498,769
[45] Date of Patent: Feb. 12, 1985

[54] DEVICE FOR EXAMINING AN OBJECT UNDER CONDITIONS OF LIGHTING ON A BLACK BACKGROUND

[75] Inventor: Jean-Pierre Cuvilly, Viels Maison, France

[73] Assignee: Essilor International, Creteil, France

[21] Appl. No.: 367,879

[22] Filed: Apr. 13, 1982

[30] Foreign Application Priority Data

Apr. 29, 1981 [FR] France ................................. 81 08559

[51] Int. Cl.³ ...................... G01N 21/01; G02B 21/10
[52] U.S. Cl. .................................... 356/244; 350/525
[58] Field of Search ................. 356/124, 244; 350/525

[56] References Cited

U.S. PATENT DOCUMENTS

| | | | |
|---|---|---|---|
| 1,999,240 | 4/1935 | Kraft et al. | 350/525 |
| 2,332,668 | 10/1943 | Richards | 350/525 |
| 3,652,169 | 3/1972 | Danti et al. | 356/244 |
| 3,920,311 | 11/1975 | Tsuda et al. | 350/525 |
| 4,194,814 | 3/1980 | Fischer et al. | 350/160 H |

Primary Examiner—Vincent P. McGraw
Attorney, Agent, or Firm—Burgess, Ryan and Wayne

[57] ABSTRACT

A device for examining under conditions of lighting on a black background an object such as the surface of a spectacle lens, comprising, in a casing, a support for supporting the object to be examined, and black background lighting means including an opaque screen adapted to arrest the light rays issuing from a light source and able of penetrating directly an aperture provided in said support, as well as reflecting and/or concentrating means adapted to reflect laterally the light beams issuing from said light source, which are transmitted to said object through said aperture, said light source being disposed in a fixed position determined with reference to the periphery of said opaque screen, wherein said casing comprises a mounting opening which opens into an opening of said reflecting means and allows said light source supported by said screen on the side opposite to the aperture of the support to be easily mounted in position.

2 Claims, 2 Drawing Figures

DEVICE FOR EXAMINING AN OBJECT UNDER CONDITIONS OF LIGHTING ON A BLACK BACKGROUND

DEFINITION OF THE GENERAL FIELD OF THE INVENTION

The present invention is related to a device for examining or observing a body or object under conditions of lighting with (or on) a black background, the object to be examined being constituted, more particularly, by a scratched or engraved pattern existing on the surface of a spectacle lens.

BACKGROUND OF THE INVENTION

Devices for lighting with a black background are used especially in the field of ultra-microscopy, and are adapted to transmit toward an observer only the light transmitted or diffused by the object to be observed which appears brilliant on a black background, in a way similar to that of microscopic dust particles floating in still air and reflecting a sun beam so as to be clearly visible to the naked eye. These devices comprise a screen adapted to arrest all the light rays which might penetrate directly the objective of an optical system, whereby the light beams lighting the preparation or object to be examined are extremely oblique. These light beams are inclined under an angle greater than the corner angle of the objective, which latter thus only receives the light rays diffused or diffracted by the contours of the object, whereby said contours appear lighted on a black background. The black-background lighting devices generally use spherical mirrors for reflecting the light rays.

This lighting mode is used especially with a view to observing small organisms which are difficult to color and the refraction index of which is rather close to that of the medium environing said organisms. Said lighting mode is used more particularly with a view to detecting the presence of certain microbes. These organisms can already be detected when ordinary lighting is used, however, they are become more easily visible on a black background.

One novel and special example of the various applications of black-background lighting method is the detecting or reading of patterns engraved on the surface of spectacle lenses. It should be recalled here that spectacle lenses may be provided with various very lightly engraved patterns located in an area in the vicinity of the external peripheric third of the lens, such patterns representing:

two circles disposed symmetrically on either side of the center, for determining the optical axis of the lenses with a view to allowing the latter to be centered in the associated spectacle frame;

the trade mark or name of the manufacturer;

the optical power of the lens, expressed in dioptries, or—in the case of multifocal lenses—the differential optical power, expressed in dioptries, between the zone of close vision and the zone of remote vision.

Such markings which must not constitute a nuisance for the user of the spectacles are only clearly visible and readable under conditions of "grazing" light ray incidence, and the opticians who look for these markings so as to get knowledge of the characteristics of a lens or to effect its centering in a spectacle frame encounter considerable difficulty when endeavouring to read such markings while using a laterally lighting lamp. In certain occurrencens the reading of these markings is still more critical, especially when after an accidental destruction of the lenses, only fragments of reduced dimensions are available, and when one looks for that fragment (or those fragments) which carries (or carry) the marking of the dammaged spectacle lens.

Thus it has been recognized that there existed a need for an observing device which could be used in a particularly easy manner. This requirement may be met by the known devices used in the field of ultra-microscopy; however these known devices are too expensive and are not well adapted to be easily handled and to allow the observation or examination of spectacle lenses to be easily carried out.

SUMMARY DEFINITION OF THE OBJECT OF THE INVENTION

One of the objects of the instant invention is precisely to provide an observation device with black-background lighting of particularly simple construction, which is adapted to be manufactured at comparatively low cost and permits easy and accurate adjustment, said device being adapted to receive a spectacle lens or, possibly, a fragment of a spectacle lens, and allowing the professional characteristics of said lens, such as markings related to be manufacturer's trade mark or the like, the centering, the optical power expressed in dioptries, which are provided on the surface of the lens, to be detected or read.

SUMMARY DEFINITION OF THE INVENTION

With this general object in view, the invention is directed to a device for examining, under black-background lighting conditions, a body or object, particularly the surface of a spectacle lens, which device comprises, in a casing, a support for holding said object, and black-background lighting means including an opaque screen adapted to arrest the light rays issuing from a light source and able of penetrating directly an aperture provided in said support, as well as reflecting and/or concentrating means adapted to reflect laterally the light beams issuing from said source, which are transmitted to said object through said aperture of the support, wherein said light source is mounted in a fixed position determined with reference to the periphery of said screen, and wherein said reflecting means and said casing comprise each a mounting opening allowing said light source to be easily placed on that side of said screen which is opposite to said aperture of said support.

Due to this arrangement the adjustment of the position of the light source with reference to the screen is rendered superfluous, and said source can be placed in a location as close as possible to the aperture of the support, while the random or erratic light rays are arrested within the casing.

In a preferred embodiment of the invention the light source is supported by the screen on the side opposite to the aperture.

In one particular embodiment the screen has the shape of a cylindrical pot an outer flange of which constitutes the periphery of the screen, the body and bottom portions of said screen being directed toward the aperture of the support and comprising connections with an electric current feeding source, as well as means for fixing at least one electric light bulb constituting the light source of the device. The position of the screen with respect to the aperture of the support may be adjustable, so as to allow the angle of inclination of the light rays passing through said aperture to be varied. When the screen is integral with the reflecting means their position may also be adjustable with respect to the aperture of the support, so that it is possible to bring the light source to a location close to said aperture.

In one specific embodiment the device adapted to be used by an operator for examining various markings provided on the surface of spectacle lenses or fragments thereof comprises an observation support provided with an examining aperture and has the shape of a plate with a slightly outwardly curved profile, said plate being fixed underneath an oblong opening of the casing, the width of said opening being so selected that it can receive the largest spectacle lenses, while the length of said opening is so selected that it is just possible to transfer said lenses by a sliding motion with a view to bringing successively different marked arears of said lenses to a location opposite to the aperture of the support, while the edges of the opening of said casing, which protrude above the opaque plate constitute a stop rim for positoning the lens which the operator displaces slidingly on the surface of said plate for observing the various markings provided on said lens. The opaque plate may be made of plastic material and be provided with reference marks for facilitating the positioning of each spectacle lens with respect to the aperture with a view to observing the markings provided on the surface of said lens.

Other features and advantages of the invention will become apparent from the following detailed description of one embodiment of the invention, which makes reference to the appended drawing, and which is given by way of example, but not of limitation.

DETAILED DESCRIPTION OF ONE EMBODIMENT OF THE INVENTION

Figure 1:
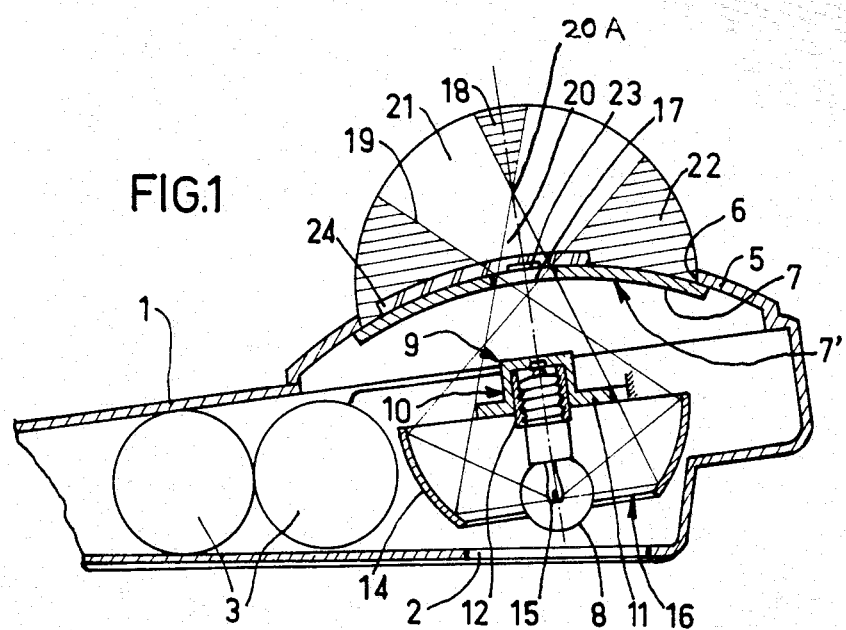
FIG. 1 is a sectional view taken along the line A—A of FIG. 2 and shows a device according to the invention.
Figure 2:
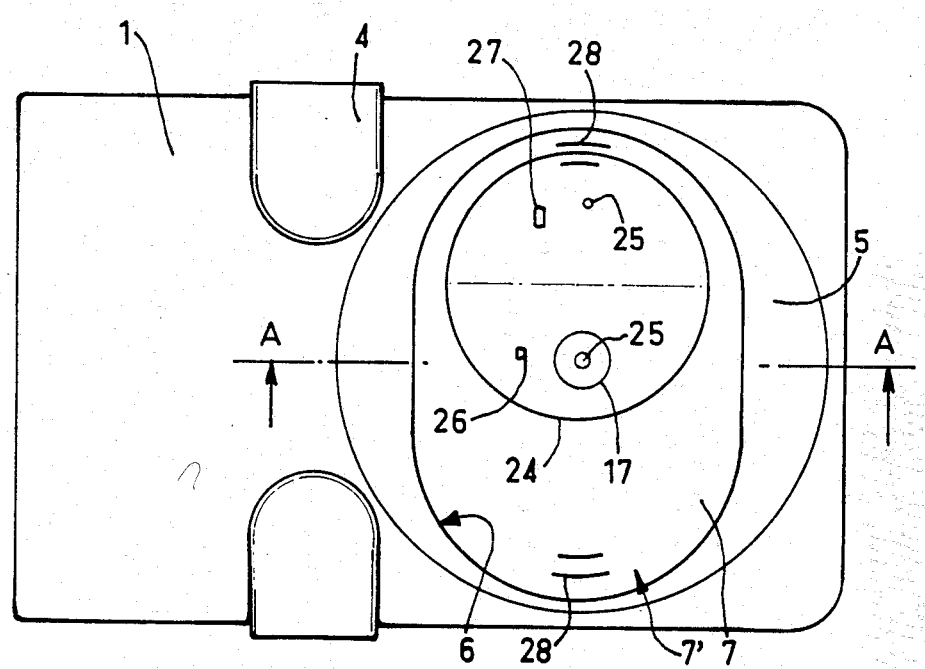
FIG. 2 is a plan view of the same device.

The device according to the invention, as shown in FIGS. 1 and 2, which allows the engraved markings provided on spectacle lens surfaces to be observed, comprises a casing 1 made preferably of opaque or light-proof plastic material and having a lower opening 2 which renders the optical system accessible. Lateral contacts 4 are provided on the side of casing 1 and allow the light source to be actuated by contact with the hands of the operator, while also facilitating the manipulations to be effected by said operator when the latter endeavours to observe the engraved markings provided on a spectacle lens fixed on a spectacle frame. Case 1 comprises at its top portion a circular area 5 having an outwardly curved profile, wherein is provided an oblong opening 6 sealed by an opaque plate 7 having a curved profile of the same radius as that of portion 5, said plate 7, which forms a support 7', being fixed to portion 5 by any convenient means, such as gluing or welding.

According to the invention a light source constituted by an electric incandescent lamp or bulb 8 is fixed to a screen 9 having the form of a cylindrical pot 10 provided with a flat flange portion 11 which constitutes the periphery of the screen. Bulb 8 is threaded into a socket 12 mounted within pot 10, and is connected to an electric current feeding source formed, by example, by two batteries 3 disposed within casing 1. Opaque plate 7 has an aperture 17 serving as a diaphragm and as an observation aperture, said plate 7 constituting in fact the said support 7'.

As shown in FIG. 1, the light rays issuing from bulb 8 and reflected by a mirror 14 area arrested partially by screen 8, 11 so as to form a central light cone 20 the corner angle of which is limited by diaphragm 17, and the base of which is directed toward diaphragm 17, while its apex 20A is located at a distance from said diaphragm, in front of curved plate 7 and lens 24 placed thereon in such a manner that the engraved markings 23 to be observed, which are provided on one of the surfaces of lens 24, are lighted by light cone 20. The light rays forming central cone 20 are inclined with respect to the axis of symmetry of the latter, and thus an "extinguished" or dark cone 18 which does not receive any light rays from bulb 8 and which is reflected by mirror 14 is formed beyond cone 20, along the same axis and corresponding to the same corner angle. Said light rays reflected by mirror 14 pass through an area 21 peripherally adjacent to cone 18, which area is not utilized (dead area).

With a view to reading engraved markings 23 (FIG. 1) provided on one of the surfaces of a spectacle lens 24, the operator places the lens onto the outer surface of curved plate 7 or—when the lens is fixed onto a spectacle frame—maintains said frame above plate 7 which constitutes support 7'. Such engraved markings may be constituted, for example, by two circles 25 symmetrically disposed with respect to the optical axis of the lens, by indications 26 relating to the optical power (direct or differential) of the lens, as expressed in dioptries, or the trade mark or similar designation 27 of the manufacturer.

By pressing lateral contacts 4 the operator actuates bulb 8, i.e. causes it to be lighted. He then places one of his eyes in the dark cone 18 and slidingly displaces lens 24 on plate 7, or else displaces the spectacle frame, until one of the engraved markings 25, 26, 27 is placed within the luminous zone of cone 20. At this time the operator can read easily and without any visual fatigue the related engraved marking which appears brillant on a black background. The operator is enabled to determine the position of the engraved marking on the lens, in accordance with the character of the marking. Plate 7 is preferably made of a plastic material which involves no risk of scratching the spectacle lens which may also be made of plastic material.

Reference or guide marks 28 provided on the external surface of plate 7 allow different positions of the edges of lenses, such as 24, to be determined when one of the engraved markings 23 is located in front of diaphragm 17.

Screen 9 is maintained in position, preferably, by the lateral walls of casing 1, which also applies to spherical mirrors 14, and the position of screen 9 and/or mirror 14 may be adjustable, whereby the angle of incidence of the light rays and the angle of cone 20 can be varied. As shown in FIG. 1, the mounting, replacement and adjusting of bulb 8 and screen 9 are easily carried out, since these operation can be effected through openings 2 and 16 which are easily accessible to the hand of the operator.

The light rays which do not reach the outside environment for forming cone 20 are arrested within casing 1 the walls of which are preferably provided with a black color layer so as to avoid parasite light reflection phenomena and enhance the background for satisfactory examination or observation.

It should be noted that casing 1 may be so constructed that contacts 4 are placed respectively on either side of oblong opening 6.

The invention is not limited to the embodiments described hereinabove and shown in the appended drawing. Many variants and modifications may be envisaged by those skilled in the art without departing from the spirit and scope of the invention as defined in the appended claims.

What is claimed is:

1. A device for examining under conditions of lighting on a black background an object such as the surface of a spectacle lens, and adapted to be used by an operator for examining different markings provided on a surface of a spectacle lens comprising, in a casing,
    a support for supporting the object to be examined, said support being constituted by an opaque plate having a profile slightly curved outwardly, and said opaque plate being fixed beneath an oval opening of said casing, the width of said opening being so selected that it can receive large spectacle lenses, while its length is so selected that it renders it just possible to displace slidingly said lenses with a view to placing zones thereof provided with said markings in front of an aperture of of the support, and
    black-background lighting means including an opaque screen adapted to arrest light rays issuing from a light source and capable of penetrating directly said aperture provided in said support, as well as reflecting and/or concentration means adapted to reflect laterally the light beams issuing from said light source, which are transmitted to said object through said aperture, said light source being disposed in a fixed position determined with reference to the periphery of said opaque screen, and
    said casing comprises a mounting opening which opens into an opening of said reflecting and/or concentration means and allows said light source supported by said screen on the side opposite to the aperture of the support to be easily mounted in position and edges of the oval opening of the casing, which project above said opaque plate, constitute a stop rim for positioning the spectacle lens slidingly displaced by the operator with a view to observing the different markings engraved on said lens.

2. The device of claim 1, wherein said opaque plate is provided with reference marks, and wherein said reference marks are disposed in such a manner that they allow of determining the position of each spectacle lens or fragment thereof with respect to said aperture, and thus allow the markings engraved on the surface of said lens to be observed.

* * * * *